United States Patent Office.

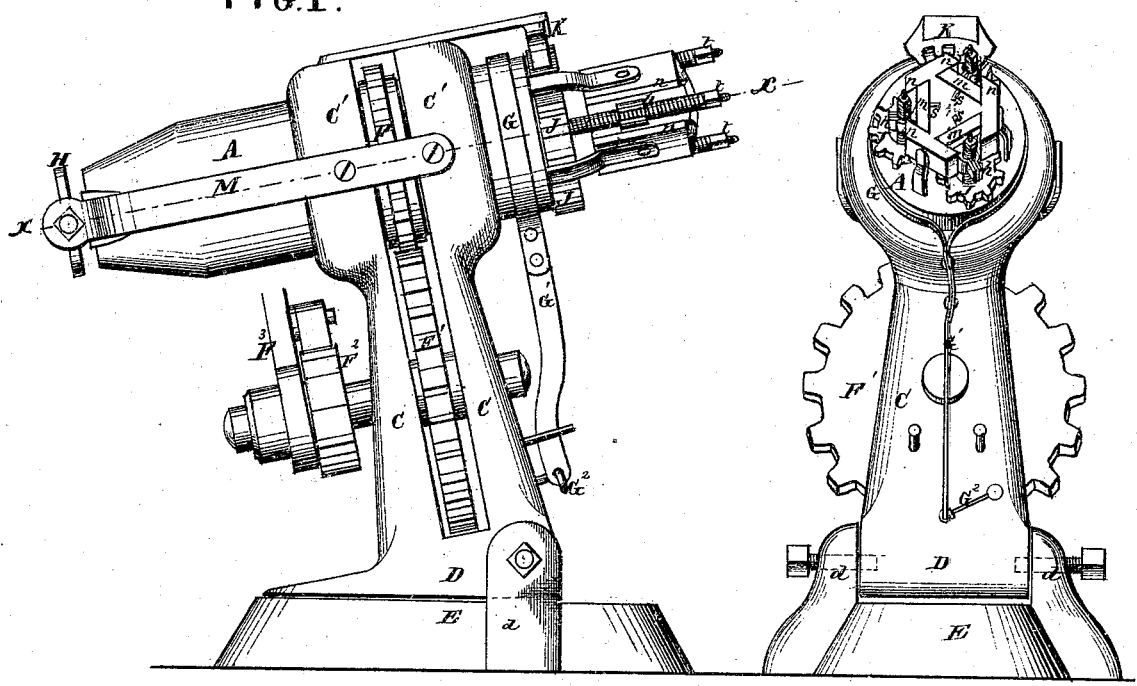
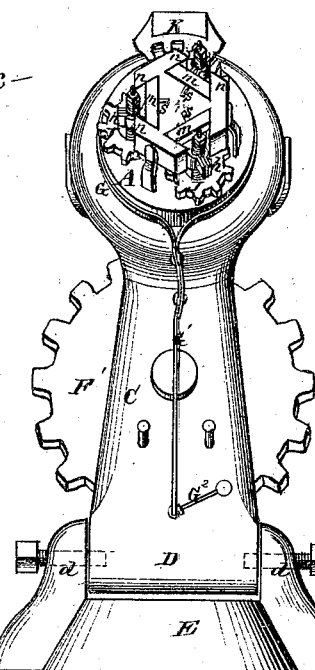
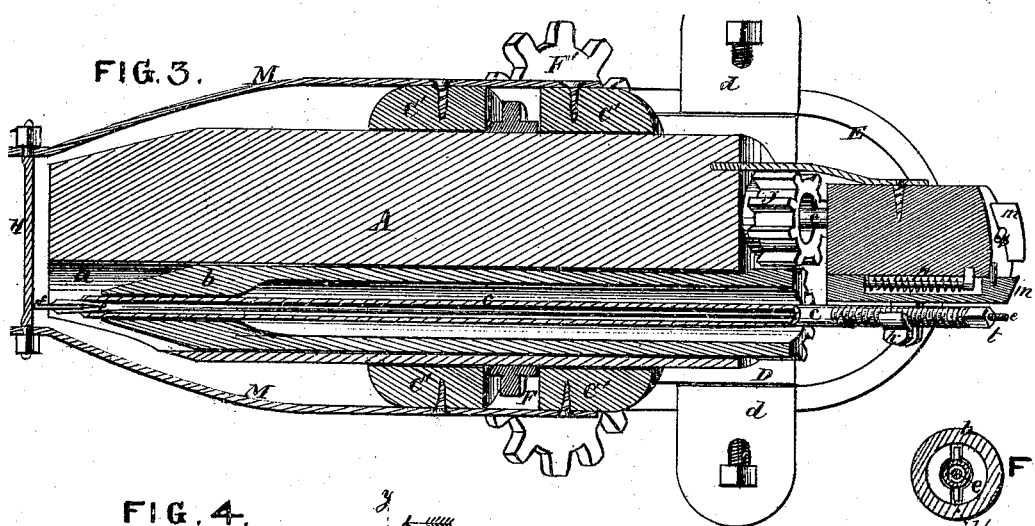
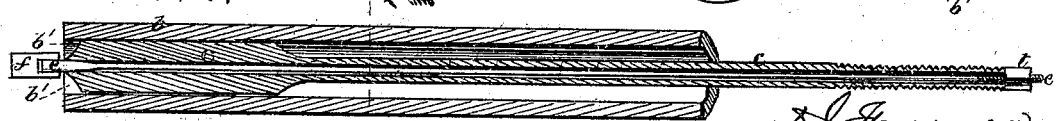

DAVID J. FARMER, OF WHEELING, WEST VIRGINIA.

Letters Patent No. 113,644, dated April 11, 1871.

IMPROVEMENT IN NAIL AND TACK-PLATE FEEDERS.

The Schedule referred to in these Letters Patent and making part of the same.

I, DAVID J. FARMER, of Wheeling, in the county of Ohio and State of West Virginia, have invented a new and improved Nail and Tack-Plate Feeder, of which the following is a specification.

Nature and Objects of the Invention.

My invention relates to a portable device, in which the feeders (one or more) are mounted in a rotary head, and semi-rotated between the cuts to turn the plates.

When more than one feeder is used, say three, for instance, (as in the illustration,) they are grouped around the axis of revolution, and rotate in bearings or in tubes whose axes are parallel to that of the rotary head.

The rotary head receives an intermittent rotation through an arc of one hundred and twenty degrees (in the case of the machine illustrated) between the successive strokes of the cutter, which severs the nail-blank.

The nail-plate is held by nippers whose shank passes through a tube at whose end is a nut, which is intended to be rotated by a common wrench or key to open or close the nippers.

The tube slips into the feeder, and has fins which prevent its rotation therein, so that, as the feeder is semi-rotated at intervals the nipper-holding tube partakes of the motion and presents the plate, so that the taper of the nail-blanks is in alternate directions as to the plate.

On the tube is a thread engaged by a spring nut on the holder. As the feeders rotate the threaded tube is advanced relatively to said nut a distance equal to half the pitch of the screw. This is equal to the medium width of the nail-blank.

The holder has a spring arrangement which keeps the nail-plate holder up to its work.

The head-stock is capable of being turned back from the cutter when necessary.

Description of the Accompanying Drawing.

Figure 1 is a side elevation of the machine.
Figure 2 is a rear elevation of the machine.
Figure 3 is a sectional view on the line $x\ x$ fig. 1, but on an enlarged scale.
Figure 4 is a central longitudinal section through one of the feeders and the contained plate-holder and rod. This view is also on an enlarged scale from fig. 1.
Figure 5 is a transverse section on the line $y\ y$, fig. 4.

General Description.

The machine is intended to hold nail-plates and feed them to the cutter, from which the nails pass to other machinery, where they are finished.

The illustration only exhibits the feed device. The apparatus is shown as adapted to working three feeders consecutively, but it may be applied to operate more or less than three.

A is a rotary head having three cylindrical chambers $a$ parallel to and around the central axis.

The rotary head A is mounted on standards C C, which rise from a foot, D, hinged at $d$ to the base-plate E. This enables the whole arrangement to be oscillated backward so as to remove it from the cutting apparatus (not shown) when it may be necessary to withdraw the feeder out of action.

The two sleeves, C' C', on the summits of the standards C C, embrace the rotary head and form bearings therefor.

The head is rotated in its bearings by means of gearing F on the head, a wheel, $F^1$, mounted between the standards, and a ratchet-wheel and lever, $F^2\ F^3$, operated in any convenient manner.

G is a friction-brake, sleeved upon the rotary head A, and having a tail, $G^1$, connected by a spring, $G^2$, to a stud on the standard C. The functions of this brake is to regulate the motion of the rotary head, prevent loose action, and bring the nail-plate back positively to the gauge H when a sudden and quick impulse may have rotated the head a little too far.

It is made of flexible material, such as sheet-steel, and embraces the head tightly so as at all times to produce some friction. The tendency therefore, is, for the same to be carried around by the head. This tendency is resisted at proper speed by the spring $G^2$, which is so regulated as only to do this. If the speed is too great the said spring yields, and the tail $G^1$ comes in contact with its stop and is reflexed more or less. This action brings the surface of the brake immediately behind the said tail into closer contact, making the whole hug more tightly, and thus increases the friction to the requisite extent. When the speed is sufficiently reduced the spring $G^2$ returns the parts to their normal positions.

Each of the cylindrical chambers $a$ in the rotary head is occupied by a feeder, which consists of a cylinder, $b$, fig. 3, occupied by a hollow tube, $c$, and an axial rod, $e$.

The rod $e$, figs. 3, 4, and 5, has at one end a pair of nipping-jaws to hold the plate $f$.

On the other end of the rod is a screw-thread, traversed by a nut, $t$. The rod slips into the tube $c$, and as the nut is screwed upon it the nippers, by being drawn partially within the end of the tube, are forced shut upon the plate, holding it fast.

The tube $c$ has fins on opposite sides, which slip in grooves $b'$ on the inside of the cylinder $b$ near its forward end, so that the tube $c$ cannot rotate in the cylinder.

To facilitate the introduction of the tubes $c$, the hollow within the feeder b is made of large capacity for the greater part of its length, and converges gradually, as shown in fig. 3, toward the contracted part in which the grooves b' are formed.

The outer portion of the tube c is threaded, and is embraced by a spring nut, h.

That end of the cylinder b which is presented toward the guard-plate H is tapered, and on the other end is a pinion, J.

When the head A is rotated, the pinions of the cylinders b are brought consecutively into engagement with the segment-rack K, which is attached to the upper portion of the sleeves C' C', and overhangs the rear end of the rotary head A.

The segment-rack K is provided with one-half as many teeth as the respective pinions J, so that the pinion becoming engaged therewith is half rotated once during each rotation of the head. It will thus be apparent that the feeders revolve around the general axis of the head and have a half-rotation in the period of each revolution.

This half-rotation has two objects:

First, it presents the plate f to the cutter with the respective sides up alternately, so that the plate may be cut "heads and points," but with points presented always in the same direction relatively to the machine.

Second, the semi-rotation of the feeder rotates the threaded tube in the spring nut h, and advances it relatively thereto a distance equal to one-half the pitch of the screw. This is the length of feed for the width of a nail at its midlength.

The spring nut h is attached to a slide, m, slipping in jaws n under the influence of a spring, p.

The pin s on the end of each slide limits the forward motion.

The spring yields to the backward movement of the nut h, which is caused by the turning of the nipper-rod and the resistance offered by the guard-plate H, until the head has in its rotation brought the nail-plate in line with the notch in the guard-plate, at which time the spring will force the tube c and the nipper-rod forward, projecting the nail-plate through the notch in the guard-flange H to the cutting apparatus.

The guard-flange H is swiveled to bearing-arms M, from the sleeves C of the standards.

In place of the pinions on the cylinders b and the toothed segment K, I propose in some cases to use a frictional or rubbing arrangement.

The cylinder A may be made of any size with one or any number of feeders.

The device is portable, and may be readily applied to nail-cutting machines, the feeder being arranged either above or below the cutters, as most convenient. The device is designed to be worked by the ratchet-levers, and to be operated by any suitable mechanism to connect the different machines, as a given case may require.

I have not thought it necessary to illustrate any way of connecting my feeding apparatus with a nail-cutting machine, because the mode of making such connections in each particular case will be clearly understood by the skilled mechanic, but will necessarily vary with different machines. One way of applying a feeder of analogous construction is illustrated in my patent of May 31, 1870. Patents heretofore granted to me show, also, examples of means which may be employed for rotating the head or frame which carries the feeders, and for determining the position of the feeders within it.

Claims.

What I claim as new, is—

1. The sleeves C' C', standards C C, hinged shoe D, and base-plate E, constructed and combined as shown and described, for supporting the rotary head A in proper working position, and permitting its retraction.

2. The friction-brake G, constructed and operating substantially as set forth for regulating the movement of the rotary head A.

3. The combination of the feeders b, tubes c, and nipper-rods e, and mechanism to actuate said parts severally, substantially in the manner described.

4. The nipper-rod e, threaded tube c, nut h, and spring slide m working in guides n, in combination with a rotary feeder, b, and gauge H, for feeding the plate, as set forth.

DAVID J. FARMER.

Witnesses:
 OCTAVIUS KNIGHT,
 WM. H. BRERETON, Jr.